J. WAHL.
EXTENSIBLE SUPPORT FOR COOKING VESSELS.
APPLICATION FILED FEB. 15, 1907.
927,300.
Patented July 6, 1909.
2 SHEETS—SHEET 1.
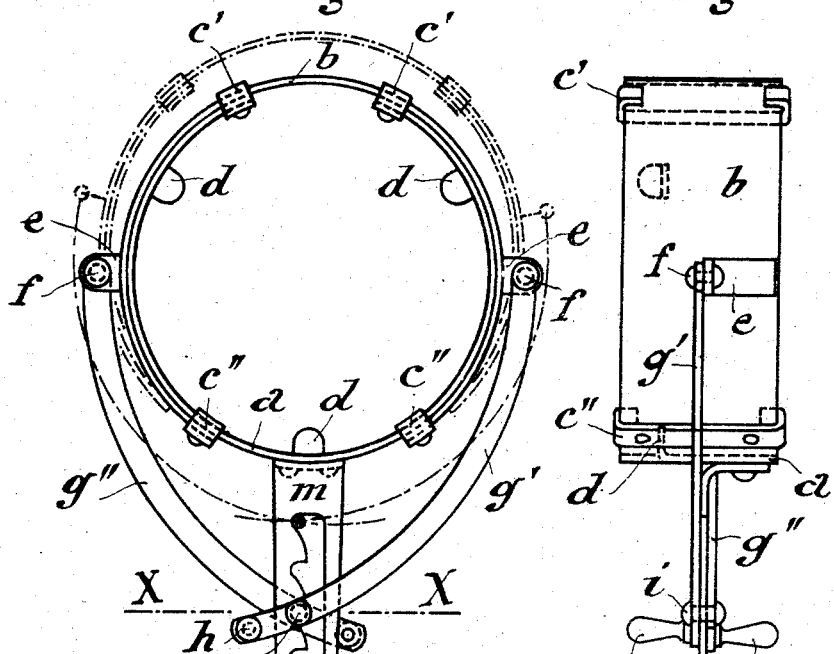
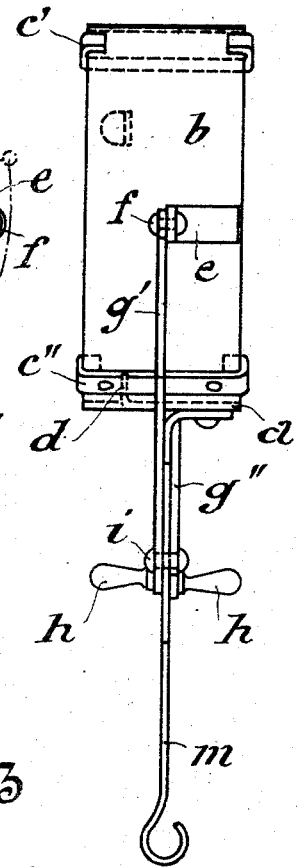
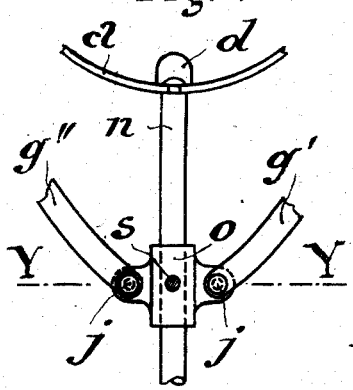
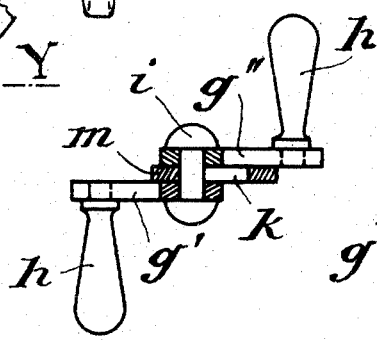
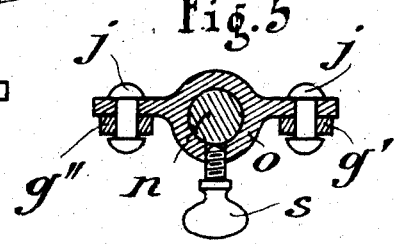

J. WAHL.
EXTENSIBLE SUPPORT FOR COOKING VESSELS.
APPLICATION FILED FEB. 15, 1907.
927,300.
Patented July 6, 1909.
2 SHEETS—SHEET 2.
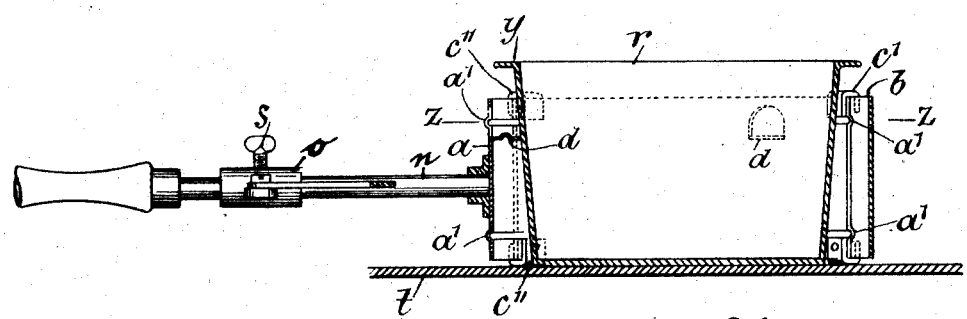
Fig. 5.ᵃ
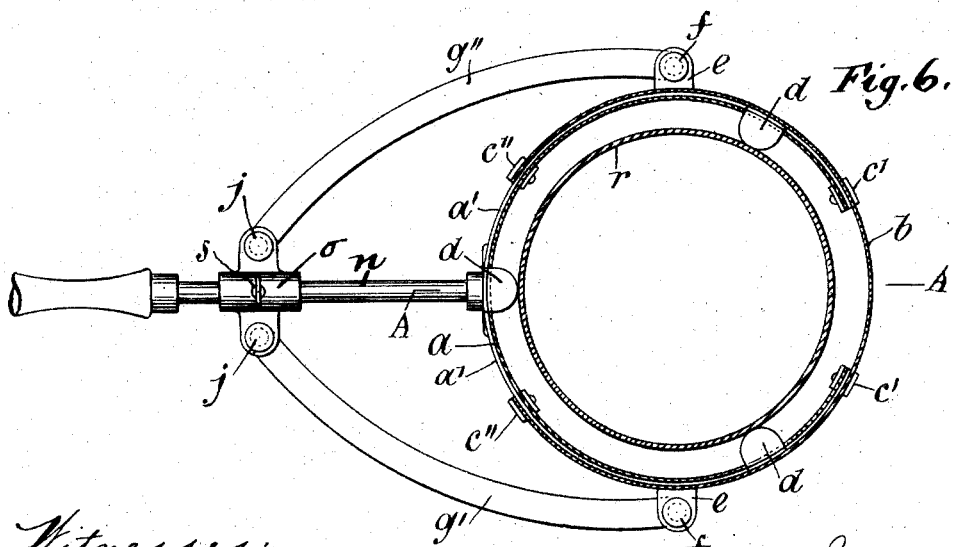
Fig. 6.

UNITED STATES PATENT OFFICE.

JACQUES WAHL, OF BASEL, SWITZERLAND.

EXTENSIBLE SUPPORT FOR COOKING VESSELS.

No. 927,300.   Specification of Letters Patent.   Patented July 6, 1909.

Application filed February 15, 1907. Serial No. 357,522.

*To all whom it may concern:*

Be it known that I, JACQUES WAHL, a citizen of the Swiss Republic, residing at 15 Kohlenberg, Basel, Switzerland, have invented certain new and useful Improvements in Extensible Supports for Cooking Vessels, of which the following is a specification.

This invention relates to extensible supports for cooking vessels composed of two open rings slidably mounted one on the other so that the support can be adjusted to different sized cooking vessels.

The invention is illustrated in the accompanying drawings by way of example wherein, Figure 1 is a plan, Fig. 2 is a side elevation of the same; and Fig. 3 is a section on a larger scale taken on the line X X in Fig. 1. Fig. 4 is a plan, and Fig. 5 is a section on the line Y Y in Fig. 4, of a modified form of a detail of the first example. Fig. 5ᵃ is a section elevation taken on the line A A in Fig. 6, and Fig. 6 is a sectional plan taken on the line Z Z in Fig. 5ᵃ, showing the device in use supporting a cooking utensil $r$ on the hot plate $t$ of a stove.

An open ring $a$ is surrounded over the largest part of its circumference by a second open ring $b$. The open places in the two rings are diametrically opposite to one another. To the two ends of the ring $a$ are fixed metal clips $c'$ the ends of which are bent over the upper and lower edges of the ring $b$ so as to form guides in which the ring $b$ is free to slide. To the two ends of the outer ring $b$ similar guide clips $c''$ are fixed which hook on to the inner ring $a$. The four clips hold the two rings together above and below, but not so firmly as to prevent the rings from moving in the clips. For the purpose of reducing the friction between the two rings when their diameters are altered, the inner ring $a$ may be furnished with outwardly directed, or the outer ring $b$ with inwardly directed elevations; for example small protuberances; or one or more ridges or corrugations may be provided on either ring extending around the circumference such as is shown at $a'$ in Figs. 5ᵃ and 6; these serve to strengthen the rings. On the exterior of the outer ring $b$ at almost diametrically opposite places are fixed two angle pieces $e$ to each of which a bent or curved arm $g'$ or $g''$ is linked by means of a pivot pin $f$.

In the form of the invention shown in Figs. 1 to 3 a handle $h$ is provided at the end of each arm $g'$ $g''$ and the two arms are connected with one another near their ends by a pivot pin $i$ which engages in the teeth $k$ on the flat shaft or shank $m$ fixed to the exterior of the inner ring $a$.

In the form of the invention shown in Figs. 4, 5ᵃ and 6 each of the two arms $g'$, $g''$ is linked by means of a pivot pin $j$ to a sleeve $o$ which is slidably mounted on the preferably cylindrical shaft $n$ secured to the exterior of the ring $a$, the sleeve $o$ being fixed at any desired position on the shaft $n$ by means of a set screw $s$.

When the extensible support is employed it is put on the heating apparatus $t$ and the cooking vessel $r$ placed in it as shown in Figs. 5ᵃ and 6, the circumference of the cooking vessel $r$ resting against the inwardly extending distance pieces $d$ on the inner ring $a$. These distance pieces $d$ provide a space all around between the cooking vessel $r$ and the inside of the rings, such an intermediate space is necessary for preventing the stifling of the flame. If the cooking vessel is too large to be passed between the distance pieces $d$, the diameters of the rings $a$ and $b$ are enlarged, in the first example of the invention by pushing forward the pivot pin $i$, toward the center of the rings, that is to say, by placing it behind a tooth $k$ which is farther from the outer end of the shaft $m$. In the other example the sleeve $o$ is pushed forward. In either case the ends of the two rings $a$ and $b$ separate (see the position indicated by dotted lines in Fig. 1). If on the other hand the diameter of the rings is too large the operation is reversed and the ends of the two rings are brought nearer together.

By means of the extensible support described, and which is chiefly intended for gas cooking stoves, the heat of the flame of the heating apparatus can be very advantageously utilized and the heating effect considerably increased as the heated air can only escape after it has given off the greatest portion of its heating power. The natural consequence of this is that a certain quantity of water can be brought to boiling point in less time than when this extensible support is not used and this saving of time also results in a corresponding saving of fuel.

Having fully described my invention, what I claim and desire to secure by Letters Patent is:—

1. An extensible support for cooking vessels, comprising two open rings slidably mounted one on the other and means for reducing or enlarging the open parts of the two rings, and thereby narrowing or enlarging the rings themselves comprising arms having pivotal connection at one end with one of the rings, and means for holding the arms in adjusted positions.

2. An extensible support for cooking vessels, comprising two open rings slidably mounted one on the other with their open parts diametrically opposite to one another, and means for reducing or enlarging the open parts of the two rings, and thereby narrowing or enlarging the rings themselves comprising arms having pivotal connection at one end with one of the rings, and means for holding the arms in adjusted positions.

3. An extensible support for cooking vessels, comprising two open rings slidably mounted one on the other, two arms each linked to an approximately diametrically opposite part on the exterior of the outer ring, a pivot pin connecting the other ends of said arms, an outwardly extending radial bar secured to the exterior of the inner ring and a toothed rack on said bar with the teeth of which the pivot pin is adapted to engage to adjust the size of the rings, substantially as described.

In testimony whereof I have hereunto set my hand in presence of two subscribing witnesses this 24 day of January 1907.

JACQUES WAHL.

Witnesses:
 HANS SINKELBERGER,
 GEO. GIFFORD.